United States Patent [19]
Nerz et al.

[11] Patent Number: 5,532,087
[45] Date of Patent: Jul. 2, 1996

[54] ELECTROCHEMICAL CELL

[75] Inventors: John E. Nerz, Hawthorn Woods; Han Wu, Barrington; Sanjay Goel, Schaumburg, all of Ill.

[73] Assignee: Motorola, Inc., Schaumburg, Ill.

[21] Appl. No.: 362,347

[22] Filed: Dec. 22, 1994

[51] Int. Cl.⁶ .............................. H01M 4/70; H01M 4/74
[52] U.S. Cl. .................................. 429/248; 429/229
[58] Field of Search ...................... 429/229, 142, 429/248

[56] References Cited

U.S. PATENT DOCUMENTS

| | | | |
|---|---|---|---|
| 3,497,387 | 2/1970 | Amiet | 429/229 |
| 4,039,729 | 8/1977 | Benczür-Urmössy et al. | 429/206 |
| 4,292,357 | 9/1981 | Erisman et al. | 429/229 |
| 4,298,666 | 11/1981 | Taskier | 429/206 |
| 4,385,101 | 5/1983 | Catanzarite | 429/94 |
| 5,006,428 | 4/1991 | Goebel et al. | 429/248 |
| 5,382,482 | 1/1995 | Suga et al. | 429/229 |

OTHER PUBLICATIONS

J. Electrochem vol. 138 Feb. 1991 Secondary Alkaline Zinc Electrode, McLarnon, et al.
Phase IV May '83–85 Zinc/Ferricyanide Battery Development.
J. Electrochem Soc. vol. 140 Feb. 1993 Low–Zinc–Solubility Electrolytes for Use in Zinc/Nickel Oxide Cells.

Primary Examiner—Prince Willis, Jr.
Assistant Examiner—Carol Chaney
Attorney, Agent, or Firm—Kenneth M. Massaroni

[57] ABSTRACT

An electrochemical cell (10) having a first electrode (20) and second electrode (80) and a separator (40) disposed therebetween further includes a layer of material disposed between at least one of the electrodes and the separator (52). The layer (52) is adapted to reduce the likelihood of cell failure by subduing the dendritic growth of at least one of the electrodes. The layer (52) is a layer of a metal mesh screen and may further be adapted to be used as the current collector for collecting current generated by the cell (10).

5 Claims, 4 Drawing Sheets

//  5,532,087

ELECTROCHEMICAL CELL

TECHNICAL FIELD

This invention relates in general to the field of electrochemical devices, and more particularly to the structure of such devices.

BACKGROUND OF THE INVENTION

Rechargeable electrochemical cells such as batteries, have been known for over one hundred years. Many materials are known to be particularly useful in the fabrication of rechargeable electrochemical cells. Examples of these materials include nickel hydroxide, cadmium, lead, zinc, lithium and others. For example, zinc is a desirable negative electrode material as it is light in weight and has a theoretical capacity of 0.82 Ah/g. The reversible potential of zinc is high and it is relatively inexpensive. The hydrogen overpotential in zinc is high making it stable and efficient. The high exchange current of the zinc/zincate reaction results in high reversibility and high energy efficiency. Due to these advantages, many commercially available primary batteries use zinc as the negative electrode.

Despite these advantages, one serious weakness exists and is shared with lithium. This weakness is the short cycle life attributable to zinc. Short cycle life is due principally to one of two common failure mechanisms, which are: (1) dendritic formation on the zinc surface, leading to internal shorts as these dendrites grow through the separator and reach the other electrode; and (2) shape change in the zinc electrode leading to decreased capacity. The precise reason for dendritic growth of zinc is not fully understood, though workers in the field have hypothesized that small changes in local current result in a large difference in the amount of zinc deposited at a particular site. Due to these weaknesses, zinc has not become the negative electrode in a rechargeable battery.

Zinc ions dissolve in strong alkaline solution. The high ionic solubility together with the fact that the zinc deposition reaction is fast, makes zinc unstable and sensitive to the current density distribution during charge. Hence, small changes in local currents tend to result in substantial differences in the amount of zinc deposited at a particular site. Any non uniformity on the electrode surface would produce accelerated growth at the tip where the current density is the highest. As the tip grows into the bulk of the solution, higher $Zn^{+2}$ concentration increases the growth rate and causes the dendrites to grow faster still.

Referring now to FIG. 1, there is illustrated therein a schematic representation of an electrochemical cell (10) according to the prior art. The cell (10) includes a positive electrode (20), a negative electrode (30) and a separator (40) disposed therebetween. Disposed on the side of the positive electrode (20) and negative electrode (30) opposite separator (40) is a layer of a current collecting material (50, 52) respectively. The current collector material may be fabricated of any of a number of different materials as are known in the art. With respect to the positive electrode (20), the negative electrode (30) and the separator material (40), each is fabricated of materials as are conventionally known in the art. For example, the negative electrode may be a cadmium electrode, a metal hydride electrode, a zinc electrode, a lithium electrode, and combinations thereof. The positive electrode may be a NiOOH electrode as from conventional nickel cadmium batteries, or other conventional positive electrodes such as carbon electrodes, graphite electrodes, and combinations thereof.

Workers in the field have tried numerous different ways to solve the problem of dendrite growth in conventional prior art cells as illustrated in FIG. 1. For example, the use of battery separators having very small openings, i.e., less than ~300 angstroms, to block zinc dendrites from growing through the separator. Examples of these types of separator materials include cellophane, microporous polyethylene, and other polymeric materials. Unfortunately, internal cell resistance increases as pore size decreases. The power capacity of the battery decreases, though the battery cycle life has been extended. Another approach introduces vibration at the electrode to minimize non-uniformity in the deposition of zinc. Reported cycle life was extended to over 1,000 cycles, though the design could only be easily applied to flooded electrolyte cells.

Liquid membranes have been applied to try to reduce the dendrite shorting problem. For example, porous polymeric membrane with the pores filled with ion selective liquids which conduct hydroxide but reject $Zn^{+2}$ ions have been attempted. Once again, however, internal resistance of the cell increases and thus power capacity of the battery decreases. Moreover, cycle life improvement was not dramatic in that only about 100 cycles have been reported.

A final approach has been to deposit a layer of metal on the microporous membrane. Such nickel coated membranes were used to reduce dendritic growth. The nickel layer is not connected to either electrode so that the electrochemical potential of nickel is more anodic than the zinc electrode during charge. As the zinc grows through the membrane, the tips will be oxidized and thus dissolved upon contact with the nickel layer. Cells with this type of membrane were found to increase cycle life of nickel zinc batteries from 85 cycles to approximately 425 cycles. An example of this approach is illustrated in U.S. Pat. No. 4,298,666 to Taskier.

Accordingly, there exists an economical, easy to implement approach for eliminating or reducing the results of dendritic growth in electrochemical cells, particularly those in which dendrite growth is dramatic. Examples of materials in which dendrite growth is a substantial problem include zinc and lithium batteries.

DETAILED DESCRIPTION OF THE PREFERRED EMBODIMENT

Figure 1:
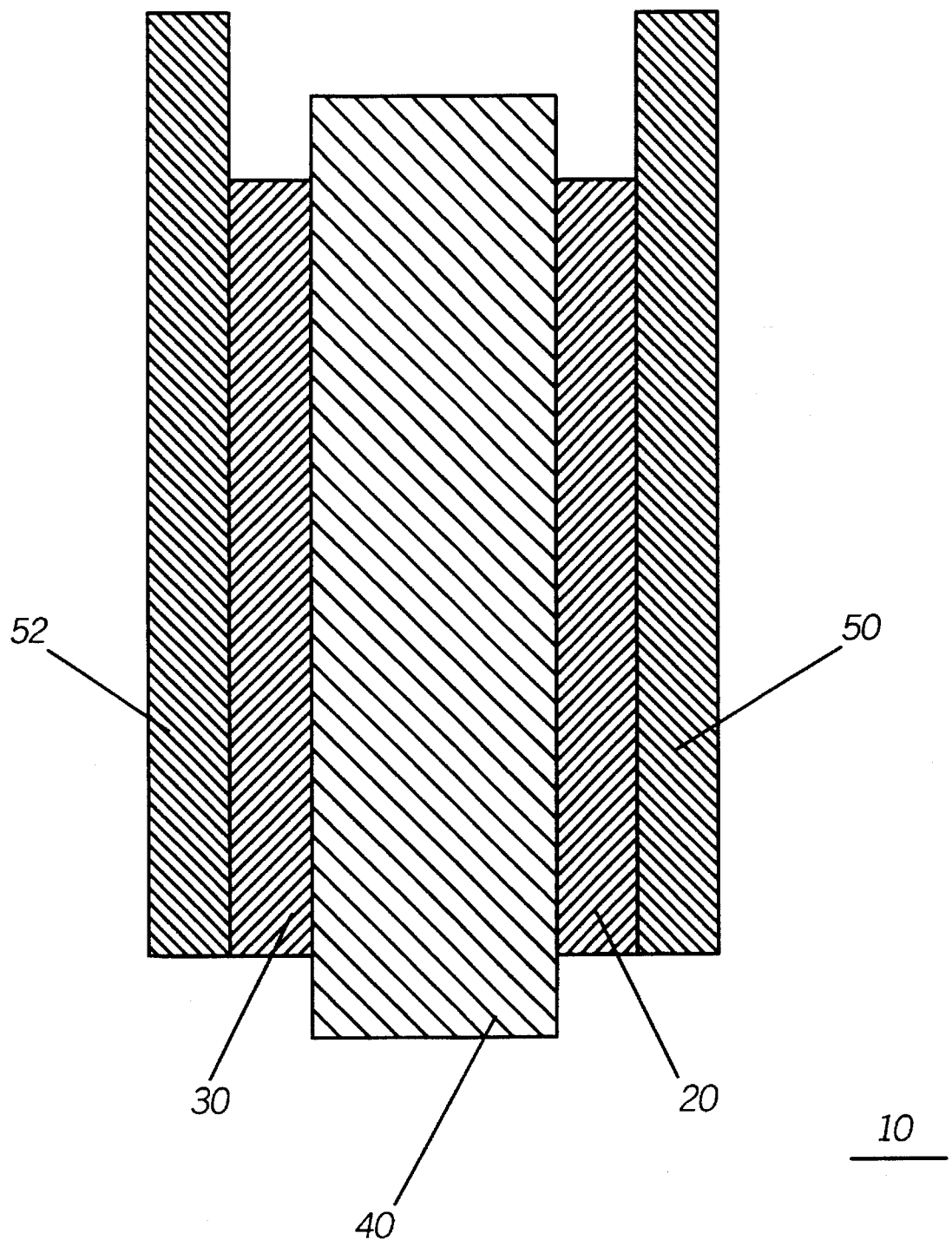
FIG. 1 is a schematic representation of an electrochemical cell according to the prior art.

While the specification concludes with claims defining the features of the invention that are regarded as novel, it is believed that the invention will be better understood from a consideration of the following description in conjunction with the drawing figures, in which like reference numerals are carried forward.

Figure 2:
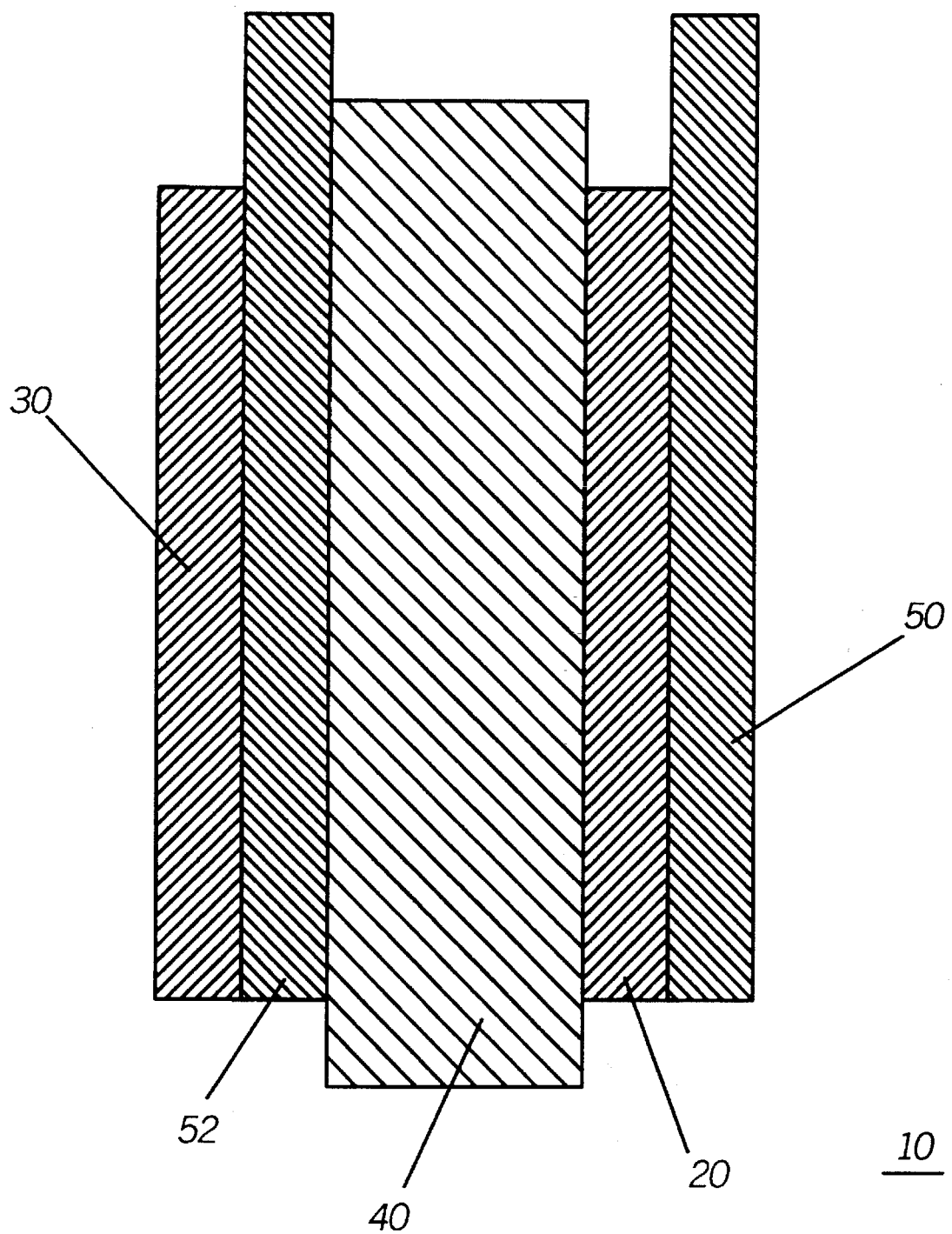
FIG. 2 is a schematic sideview of an electrochemical cell in accordance with the instant invention.

Referring now to FIG. 2, there is illustrated therein an electrochemical cell(10) in accordance with the instant invention. The cell includes positive electrode (20), negative electrode (30), and a separator material (40) as described hereinabove with respect to FIG. 1. The electrochemical cell further includes a layer of current collecting material (50) disposed on the side of electrode (20) opposite the separator material (40).

Disposed between the separator (40) and electrode (30) is a current collector for electrode (30). The current collector (52) hence is placed between the electrode (30) and the separator (40). The current collector may be a metal screen or mesh disposed between the electrode and the separator. The metal from which the screen or mesh may be fabricated may preferably be a nickel screen or mesh in which the size of the mesh is between 75 and 5,600 mm. The instant invention may be employed advantageously in cases where the electrode (30) is subject to dendritic growth as is the case with electrodes fabricated from zinc and/or lithium. Hence, the layer (52) acts to suppress the growth and/or the effect of dendrites in the electrode (30). Cycle life performance is significantly increased using the configuration illustrated in FIG. 2., as described hereinbelow with respect to FIGS. 4 and 5. This increase in cycle life is believed attributable to the fact that after a relatively few cyclings, the screen current collector (52) is covered by the active material of electrode 30, such as zinc or lithium. Consequently, the total area of active material is increased resulting in a decrease in current density. Accordingly, the possibility of non-uniform deposition of, for example, zinc is decreased. Further, the distance between the electrode and the separator is increased by adding the current collecting mesh (52). Since dendrites tend to grow perpendicular to the surface of the electrode, longer distance between the electrode and the separator means a longer growth time to reach and penetrate the separator and contact the other electrode (20). Further, since the electrode (30) is now more completely in contact with an aqueous electrolyte, the concentration of, for example, zinc in contact with the surface of the electrode is much more uniform compared to the conventional configuration illustrated in FIG. 1. As a result the deposition of the active species (such as zinc) is more uniform and hence localized heavy concentrations are avoided.

Figure 3:
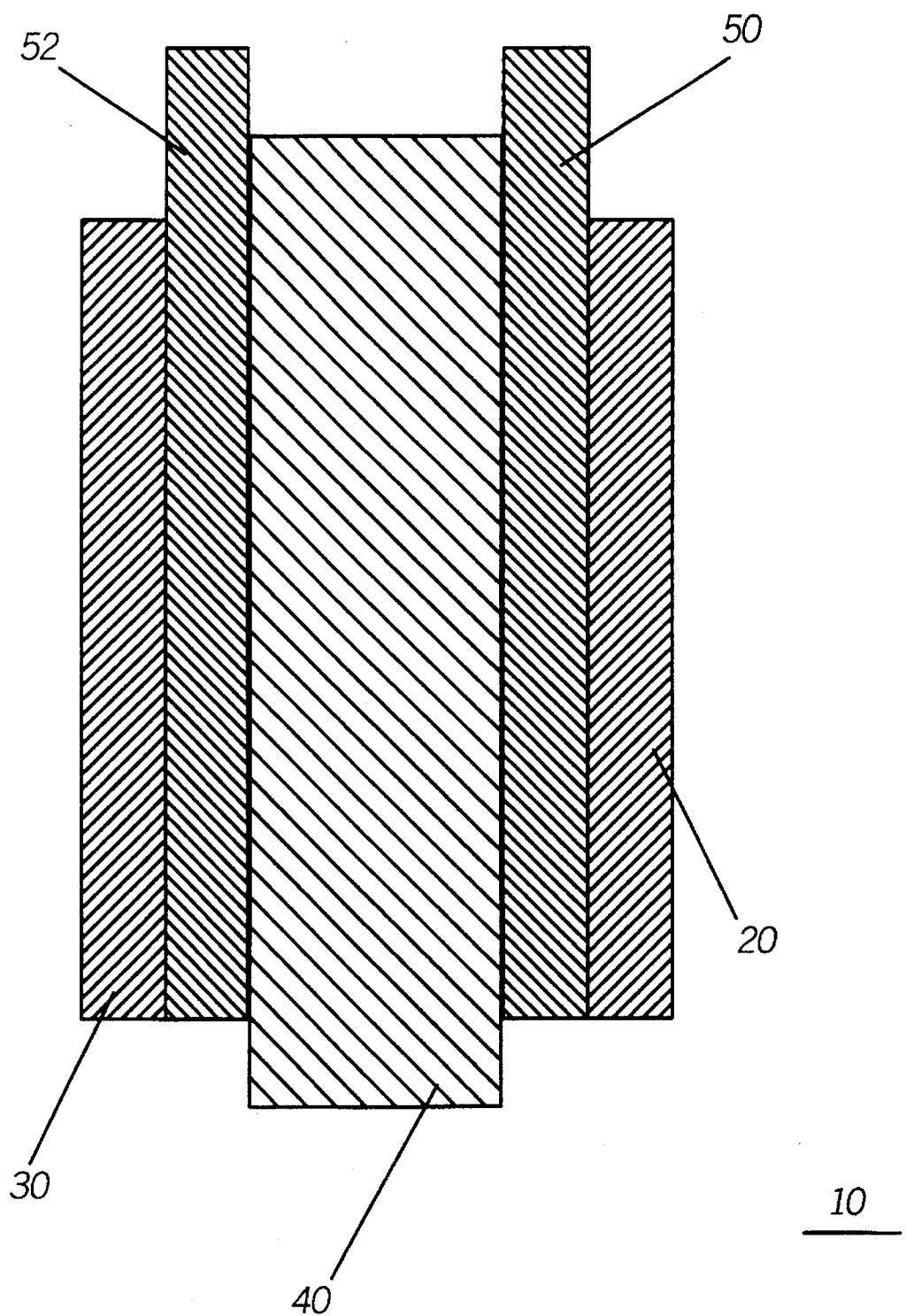
FIG. 3 is a first alternate embodiment of an electrochemical cell in accordance with the instant invention.

Referring now to FIG. 3, there is illustrated therein a first alternative embodiment of an electrochemical cell in accordance with the instant invention. The cell (10) includes a first electrode (20), a second electrode (30), and a separator (40), all as described hereinabove. In this instance, both the first and second electrodes (20 and 30) are subject to dendritic growth as described hereinabove. Accordingly, either or both electrodes may be the source of failures via shorting due to dendritic growth. In the embodiment of FIG. 3 a current collecting screen or mesh is disposed between each electrode and the separator in a manner described hereinabove with respect to FIG. 2. In this instance, the benefits attributable to the screen current collectors work to prevent the deleterious effects of dendritic growth from either electrode. Accordingly, cycle life in an cell configured as in FIG. 3 is substantially increased.

EXAMPLES

EXAMPLE I

In order to demonstrate the advantages of the configuration illustrated in FIG. 2, two batteries were fabricated and tested. In both cases, one electrode was fabricated with zinc which is subject to dendritic growth and hence failure due to such growth. Both test cells were also compared with results for electrochemical cell configurations according to the prior art. In both cases, cells fabricated with a metal mesh current collector disposed between the zinc electrode and the separator exhibited substantially longer cycle life than with conventional cell configuration.

In a first example, a silver zinc battery was fabricated using a zinc foil having a thickness of 50 µm as the negative electrode, and a thin film silver coated membrane having approximately 12,000 angsttoms of silver deposited thereon as the positive electrode. No. 6 non-woven polypropylene obtained from W. R. Grace and Co. was used as the separator in each cell. The electrolyte used in conjunction with the cell was a standard 31% KOH solution. Disposed between the zinc electrode and the separator was a layer of nickel screen used as a current collector.

The nickel screen was 3NI 5-40/FA obtained from Delker Corporation, having a thickness of 75 µm, and mesh opening size of 1000 µm. A second layer of nickel screen was disposed on the side of the silver coated electrode opposite the separator. Hence the cell described herein was assembled in accordance with the configuration illustrated in FIG. 2.

Figure 4:
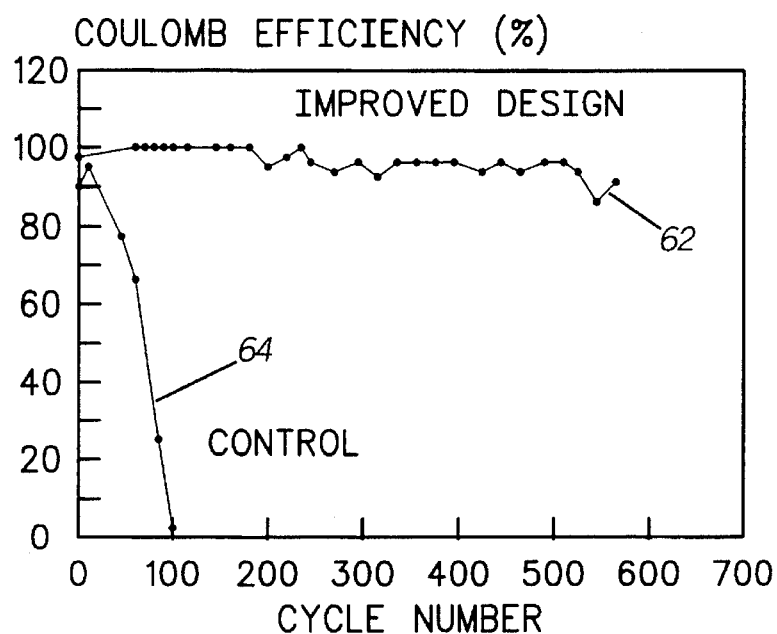
FIG. 4 is a cycle life chart comparing cycle life performance of a cell according to the prior art, with a cell prepared in accordance with the instant invention.

Referring now to FIG. 4, there is illustrated therein cycle life data for the zinc silver battery assembled in accordance with the instant invention, as compared to a zinc silver battery assembled in accordance with the prior art. Specifically, line 62 illustrates the columbic efficiency and cycle life of an electrochemical cell fabricated in accordance with the instant invention. Similarly, line 64 illustrates the performance of an electrochemical cell assembled in accordance with the prior art. As may be appreciated from a perusal of FIG. 4, the improved design in accordance with the instant invention demonstrated considerably higher columbic efficiency to approximately 600 cycles. By comparison, columbic efficiency in a cell according to the prior art dropped precipitously by approximately 25 cycles, and was essentially zero by 100 cycles. Accordingly, it may be appreciated that a cell assembled in accordance with the instant invention is as considerably improved performance characteristics as compared to the prior art.

EXAMPLE II

Figure 5:
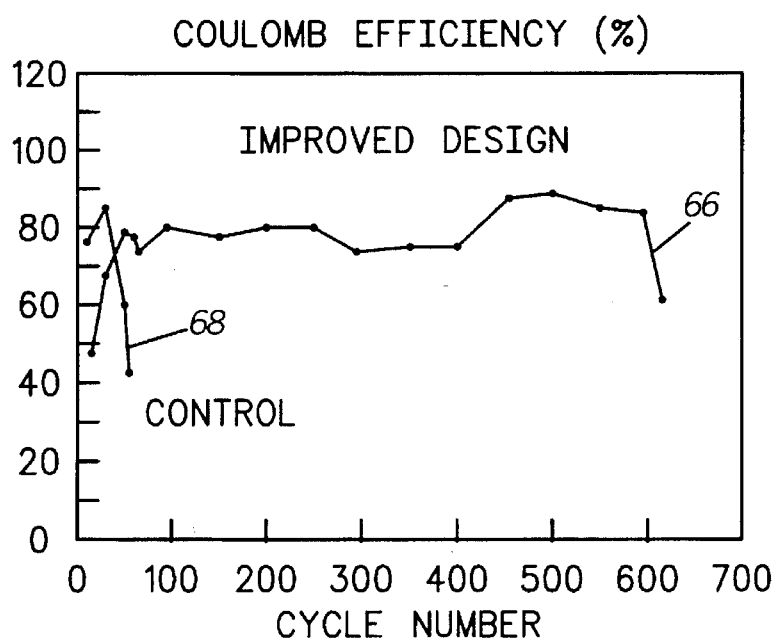
FIG. 5 is a cycle life chart comparing cycle life performance of a cell according to the prior art, with a second cell prepared in accordance with the instant invention

In a second example, a nickel zinc battery was fabricated in accordance with the instant invention and is compared with a control cell fabricated according to the prior art. The negative electrode employed was a nickel screen electroplated with zinc. The positive electrode was a standard nickel electrode as is used in commercially available nickel cadmium electrochemical cells. This electrode was much thicker and, contained more active material than that employed in Example I, and hence the electrode stores much more energy than thin film electrodes. Cycle life is also shorter for thick cells. The separators and electrolytes were as described hereinabove with respect to Example I. A nickel screen was placed between the separator and the negative electrode as the current collector. Referring now to FIG. 5, there is illustrated performance results for the cell described herein. Specifically, the cycle life and the columbic efficiency results for a cell fabricated according to the instant invention are illustrated with respect to line 66. Similarly, the cycle life and the columbic efficiency results for a cell assembled according to the prior art are illustrated by line 68. It may be appreciated that both columbic efficiency and cycle life is substantially increased by using a cell fabricated according to the instant invention. Cycle life improved from approximately five cycles in the prior art cell to approximately 60 cycles. Moreover, columbic efficiency remained consistently high as compared to the prior art cell in which efficiency dropped off precipitously after the second cycle. Accordingly, it may be appreciated that a cell fabricated according to the instant invention has a substantial advantage over those assembled according to the prior art.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrochemical cell having a first zinc foil electrode, a second electrode, and a separator disposed therebetween, said electrochemical cell further including a current collecting layer disposed between said separator and said first zinc foil electrode.

2. An electrochemical cell as in claim 1, further including a current collecting layer disposed between said separator and said second electrode.

3. An electrochemical cell as in claim 1, wherein said first electrode is fabricated of zinc.

4. An electrochemical cell as in claim 1, wherein said current collecting layer is fabricated of an electrically conductive mesh.

5. An electrochemical cell as in claim 4, wherein said current collecting layer is a nickel mesh.

* * * * *